(12) United States Patent
Tenghamn et al.

(10) Patent No.: US 10,488,536 B2
(45) Date of Patent: *Nov. 26, 2019

(54) AIR-SPRING COMPENSATION IN A PISTON-TYPE MARINE VIBRATOR

(71) Applicant: PGS Geophysical AS, Lilleaker, Oslo (NO)

(72) Inventors: Stig Rune Lennart Tenghamn, Katy, TX (US); Jonathan David Snodgrass, Des Moines, IA (US); Bo Carl Fredrik Löfgren, Järfälla (SE); Karl-Henrik Ryttersson, Västerås (SE)

(73) Assignee: PGS Geophysical AS, Oslo (NO)

( * ) Notice: Subject to any disclaimer, the term of this patent is extended or adjusted under 35 U.S.C. 154(b) by 482 days.

This patent is subject to a terminal disclaimer.

(21) Appl. No.: 15/153,467

(22) Filed: May 12, 2016

(65) Prior Publication Data

US 2016/0259074 A1    Sep. 8, 2016

Related U.S. Application Data

(63) Continuation of application No. 14/462,252, filed on Aug. 18, 2014, now Pat. No. 9,507,037, which is a
(Continued)

(51) Int. Cl.
*G01V 1/04* (2006.01)
*G01V 1/143* (2006.01)
(Continued)

(52) U.S. Cl.
CPC .............. *G01V 1/04* (2013.01); *G01V 1/143* (2013.01); *G01V 1/145* (2013.01); *G01V 1/38* (2013.01); *G01V 2210/1293* (2013.01)

(58) Field of Classification Search
CPC .......... G01V 1/145; G01V 1/04; G01V 1/143; G01V 1/159; G01V 2210/1293; G01V 1/38

See application file for complete search history.

(56) References Cited

U.S. PATENT DOCUMENTS 3,370,672 A    2/1968  Eberlan
3,384,868 A    5/1968  Brown
(Continued)

FOREIGN PATENT DOCUMENTS

EP    0835462 B1    1/2003
RU    93052952 A    2/1995
(Continued)

OTHER PUBLICATIONS

USPTO Office action for U.S. Appl. No. 14/284,847 dated Apr. 14, 2016.
(Continued)

*Primary Examiner* — Isam A Alsomiri
*Assistant Examiner* — Amie M Ndure

(57) ABSTRACT

Embodiments relate to the restriction of gas flow in a piston-type marine vibrator to compensate for air-spring effects. An embodiment provides marine vibrator comprising: a containment housing; a piston plate; a fixture coupled to the containment housing; a mechanical spring element coupled to the piston plate and to the fixture; a driver coupled to the piston plate and to the fixture; and a variable gas flow restrictor disposed in an interior volume of the marine vibrator, wherein the marine vibrator has a resonance frequency selectable based at least in part on the variable gas flow restrictor.

25 Claims, 10 Drawing Sheets

Related U.S. Application Data continuation-in-part of application No. 14/284,847, filed on May 22, 2014, now Pat. No. 9,618,637.

(60) Provisional application No. 61/880,561, filed on Sep. 20, 2013.

(51) Int. Cl.
*G01V 1/145* (2006.01)
*G01V 1/38* (2006.01)

(56) References Cited

U.S. PATENT DOCUMENTS

| | | | |
|---|---|---|---|
| 3,691,516 A | 9/1972 | Graham et al. | |
| 3,964,014 A | 6/1976 | Tehon | |
| 3,978,940 A | 9/1976 | Bouyoucos | |
| 4,175,311 A | 11/1979 | Bunyan | |
| 4,185,714 A | 1/1980 | Pascouet et al. | |
| 4,211,301 A | 7/1980 | Mifsud | |
| 4,231,112 A | 10/1980 | Massa | |
| 4,466,083 A | 8/1984 | Willard et al. | |
| 4,483,411 A | 11/1984 | Mifsud | |
| 4,556,963 A | 12/1985 | Hugus et al. | |
| 4,557,348 A * | 12/1985 | Mifsud | G01V 1/145 181/120 |
| 4,578,784 A | 3/1986 | Mifsud | |
| 4,739,859 A | 4/1988 | Delano | |
| 4,785,430 A | 11/1988 | Cole | |
| 4,853,905 A | 8/1989 | Myers | |
| 4,868,799 A | 9/1989 | Massa | |
| 5,016,228 A | 5/1991 | Arnold et al. | |
| 5,050,129 A | 9/1991 | Schultz | |
| 5,062,089 A | 10/1991 | Willard et al. | |
| 5,126,979 A | 6/1992 | Rowe, Jr. et al. | |
| 5,199,005 A | 3/1993 | Forsberg | |
| 5,206,839 A | 4/1993 | Murray | |
| 5,225,731 A | 7/1993 | Owen | |
| 5,233,570 A | 8/1993 | Donskoy | |
| 5,646,380 A | 7/1997 | Vaage | |
| 5,757,726 A | 5/1998 | Tenghamn et al. | |
| 5,757,728 A | 5/1998 | Tenghamn et al. | |
| 5,959,939 A | 9/1999 | Tengham et al. | |
| 5,978,316 A | 11/1999 | Ambs | |
| 5,979,242 A * | 11/1999 | Hobbs | G01M 7/06 73/663 |
| 6,009,047 A | 12/1999 | Barger | |
| 6,041,888 A | 3/2000 | Tengham | |
| 6,076,629 A | 6/2000 | Tengham | |
| 6,076,630 A | 6/2000 | Ambs | |
| 6,085,862 A | 7/2000 | Tenghamn | |
| 6,113,642 A * | 9/2000 | Petrofsky | A61F 2/68 188/282.3 |
| 6,173,803 B1 | 1/2001 | Barger | |
| 6,230,840 B1 | 5/2001 | Ambs | |
| 6,556,510 B2 | 4/2003 | Ambs | |
| 6,606,958 B1 | 8/2003 | Bouyoucos | |
| 6,624,539 B1 | 9/2003 | Hansen et al. | |
| 6,711,097 B1 | 3/2004 | Engdahl | |
| 6,851,511 B2 | 2/2005 | Tenghamn | |
| 6,901,028 B2 | 5/2005 | Clayton et al. | |
| 7,142,481 B1 | 11/2006 | Metzbower et al. | |
| 7,164,117 B2 | 1/2007 | Breed et al. | |
| 7,377,357 B2 | 5/2008 | Duren et al. | |
| 7,468,932 B2 | 12/2008 | Tenghamn | |
| 7,539,079 B2 | 5/2009 | Hoogeveen et al. | |
| 7,551,518 B1 | 6/2009 | Tenghamn | |
| 7,562,740 B2 | 7/2009 | Ounadjela | |
| 7,663,502 B2 | 2/2010 | Breed | |
| 7,881,158 B2 | 2/2011 | Tenghamn | |
| 7,926,614 B2 | 4/2011 | Tenghamn et al. | |
| 7,929,380 B2 | 4/2011 | Wei et al. | |
| 7,957,220 B2 | 6/2011 | Howlid et al. | |
| 7,974,152 B2 | 7/2011 | Tenghamn | |
| 8,050,139 B2 | 11/2011 | Berstad | |
| 8,050,867 B2 | 11/2011 | Johnson et al. | |
| 8,061,471 B2 | 11/2011 | Wei | |
| 8,079,440 B2 | 12/2011 | Laycock | |
| 8,081,540 B2 | 12/2011 | Ross | |
| 8,094,514 B2 | 1/2012 | Tenghamn | |
| 8,098,542 B2 | 1/2012 | Hillesund et al. | |
| 8,102,731 B2 | 1/2012 | Cambois | |
| 8,154,176 B2 | 4/2012 | Karakaya et al. | |
| 8,167,082 B2 | 5/2012 | Eick et al. | |
| 8,174,927 B2 | 5/2012 | Hopperstad et al. | |
| 8,189,426 B2 | 5/2012 | West et al. | |
| 8,205,711 B2 | 6/2012 | Hopperstad et al. | |
| 8,261,875 B2 | 9/2012 | Eick et al. | |
| 8,331,198 B2 | 12/2012 | Morozov et al. | |
| 8,335,127 B2 | 12/2012 | Tenghamn | |
| 8,342,288 B2 | 1/2013 | Eick et al. | |
| 8,400,872 B2 | 3/2013 | Gulgne et al. | |
| 8,427,901 B2 | 4/2013 | Lunde et al. | |
| 8,441,892 B2 | 5/2013 | Morozov et al. | |
| 8,446,798 B2 | 5/2013 | Tenghamn | |
| 8,582,395 B2 | 11/2013 | Ferber | |
| 8,630,149 B2 | 1/2014 | Thompson et al. | |
| 8,634,276 B2 | 1/2014 | Morozov et al. | |
| 8,662,243 B2 | 3/2014 | Eick et al. | |
| 8,670,292 B2 | 3/2014 | Engdahl | |
| 8,804,462 B2 | 8/2014 | Barbour et al. | |
| 8,971,152 B2 | 3/2015 | Chelminksi | |
| 9,864,080 B2 * | 1/2018 | Tenghamn | G01V 1/135 |
| 2005/0046584 A1 | 3/2005 | Breed | |
| 2006/0193203 A1 | 8/2006 | Tenghamn et al. | |
| 2008/0253226 A1 | 10/2008 | Tenghamn et al. | |
| 2008/0308367 A1 * | 12/2008 | Gilner | F16F 9/0472 188/298 |
| 2009/0147626 A1 | 6/2009 | Vahida et al. | |
| 2009/0279387 A1 | 11/2009 | Tenghamn et al. | |
| 2010/0118646 A1 | 5/2010 | Tenghamn | |
| 2010/0118647 A1 | 5/2010 | Tenghamn | |
| 2010/0322028 A1 | 12/2010 | Tenghamn | |
| 2011/0038225 A1 | 2/2011 | Tenghamn | |
| 2011/0069741 A1 | 3/2011 | Erickson | |
| 2011/0075520 A1 | 3/2011 | Gulgne et al. | |
| 2011/0085422 A1 | 4/2011 | Thompson et al. | |
| 2011/0090759 A1 | 4/2011 | Laycock | |
| 2011/0162906 A1 | 7/2011 | Harper | |
| 2011/0297476 A1 | 12/2011 | Harper et al. | |
| 2011/0317515 A1 | 12/2011 | Tenghamn | |
| 2012/0075955 A1 | 3/2012 | Dean | |
| 2012/0081997 A1 | 4/2012 | Babour et al. | |
| 2012/0113747 A1 | 5/2012 | Ferber | |
| 2012/0147699 A1 | 6/2012 | Dellinger et al. | |
| 2012/0147709 A1 | 6/2012 | Zowarka, Jr. et al. | |
| 2012/0155217 A1 | 6/2012 | Dellinger et al. | |
| 2012/0188845 A1 | 7/2012 | Jeffryes | |
| 2012/0232780 A1 | 9/2012 | Delson et al. | |
| 2012/0314536 A1 | 12/2012 | Bagaini | |
| 2013/0037342 A1 | 2/2013 | Engdahl | |
| 2013/0100777 A1 | 4/2013 | Ruet | |
| 2013/0201792 A1 | 8/2013 | Douma | |
| 2013/0238249 A1 | 9/2013 | Xu | |
| 2014/0238773 A1 | 8/2014 | Sallas | |
| 2014/0254313 A1 | 9/2014 | Dowle | |
| 2014/0334254 A1 | 11/2014 | Zrostlik et al. | |
| 2014/0334259 A1 | 11/2014 | Tenghamn | |
| 2014/0340985 A1 | 11/2014 | Tenghamn et al. | |
| 2015/0085605 A1 | 3/2015 | Tenghamn | |
| 2015/0085606 A1 | 3/2015 | Tenghamn et al. | |
| 2015/0234072 A1 | 8/2015 | McConnell et al. | |

FOREIGN PATENT DOCUMENTS

| | | |
|---|---|---|
| RU | 2159945 C1 | 11/1999 |
| WO | 9530912 A1 | 11/1995 |
| WO | 9701770 A1 | 1/1997 |

(56) References Cited

FOREIGN PATENT DOCUMENTS

| | | |
|---|---|---|
| WO | 9917473 | 4/1999 |
| WO | 0071266 A1 | 11/2000 |

OTHER PUBLICATIONS

Extended European Search Report for European Application No. 14185771.4 dated Jul. 5, 2016.

Rune Tenghamn, "PGS Electrical Marine Vibrator," Tech Link, Nov. 2005, pp. 1-3, vol. 5, No. 11, Publication of PGS Geophysical.

Rune Tenghamn and Andrew Long, PGS shows off electrical marine vibrator to capture 'alternative' seismic source market, First Break, Jan. 2006, pp. 11-14, vol. 24.

Rune Tenghman, "Complementing Seismic Source Technology with Marine Vibrators," Presented at PGS Technology day in Oslo, Norway, Oct. 16, 2012.

Feng et al., "A Class IV Flextensional Device Based on Electrostrictive Poly(vinylidene fluoride-trifluoroethylene copolymer," Jun. 2003, pp. 1-6.

Ralph S. Woollett, "Underwater Helmholtz-Resonator Transducers: General Design Principles," NUSC Technical Report 5633, Jul. 5, 1977, pp. 1-48.

Rolex Spring Catalog, MW Industries, Inc., 2009.

Fons Ten Kroode et al., "Broadband seismic data—The importance of low frequencies," Geophysics, Mar.-Apr. 2013, pp. WA3-WA14, vol. 78, No. 2.

Ralph S. Woollett, "Current Approaches to the Miniaturization and Pressure Release Problems of VLF Transducers," Naval Underwater Systems Center, Nov. 5, 1973.

European Search report dated Sep. 14, 2015, in the prosecution of patent application No. 14183242.8, 7 pages.

USPTO Office Action for U.S. Appl. No. 14/284,847 dated Sep. 8, 2015.

USPTO Office Action for U.S. Appl. No. 14/462,052 dated Oct. 16, 2015.

USPTO Office Action for U.S. Appl. No. 14/462,098 dated Oct. 9, 2015.

USPTO Final Office Action for U.S. Appl. No. 14/284,847 dated Dec. 31, 2015.

USPTO Office Action for U.S. Appl. No. 14/462,252 dated Sep. 30, 2015.

USPTO Notice of Allowance for U.S. Appl. No. 14/462,252 dated Sep. 30, 2015.

European Search Report for European Application No. EP 14 18 5770 dated Sep. 19, 2016.

Communication for European Patent Office for Application No. 14185772.2 dated May 7, 2016.

European Search Report for Application No. 14185770.6 dated Jun. 8, 2016.

European Search Report for Application No. 14185771.4 dated Mar. 28, 2019.

Australian Examination Report for Application No. 2014227546 dated Jan. 11, 2019.

Examination report for Australia Application No. 2014227547 dated Jun. 4, 2019.

* cited by examiner

AIR-SPRING COMPENSATION IN A PISTON-TYPE MARINE VIBRATOR

CROSS-REFERENCE TO RELATED APPLICATIONS

The present application is a continuation of U.S. Nonprovisional application Ser. No. 14/462,252, filed on Aug. 18, 2014, which is a continuation-in-part of U.S. Nonprovisional application Ser. No. 14/284,847, filed on May 22, 2014, which claims priority to U.S. Provisional Application No. 61/880,561, filed on Sep. 20, 2013, the entire disclosures of which are incorporated herein by reference.

BACKGROUND

Embodiments relate generally to piston-type marine vibrators for marine geophysical surveys. More particularly, embodiments relate to the restriction of gas flow in a piston-type marine vibrator to compensate for air-spring effects.

Sound sources are generally devices that generate acoustic energy. One use of sound sources is in marine seismic surveying in which the sound sources may be employed to generate acoustic energy that travels downwardly through water and into subsurface rock. After interacting with the subsurface rock, for example, at boundaries between different subsurface layers, some of the acoustic energy may be reflected back toward the water surface and detected by specialized sensors, in the water, typically either on the water bottom or towed on one or more streamers. The detected energy may be used to infer certain properties of the subsurface rock, such as structure, mineral composition and fluid content, thereby providing information useful in the recovery of hydrocarbons.

Most of the sound sources employed today in marine seismic surveying are of the impulsive type, in which efforts are made to generate as much energy as possible during as short a time span as possible. The most commonly used of these impulsive-type sources are air guns that typically utilize compressed air to generate a sound wave. Other examples of impulsive-type sources include explosives and weight-drop impulse sources. Another type of sound source that can be used in marine seismic surveying includes marine vibrators, such as hydraulically powered sources, electro-mechanical vibrators, electrical marine seismic vibrators, and sources employing piezoelectric or magnetostrictive material. Marine vibrators typically generate vibrations through a range of frequencies in a pattern known as a "sweep" or "chirp."

Prior sound sources for use in marine seismic surveying have typically been designed for relatively high-frequency operation (e.g., above 10 Hz). However, it is well known that as sound waves travel through water and through subsurface geological structures, higher frequency sound waves may be attenuated more rapidly than lower frequency sound waves, and consequently, lower frequency sound waves can be transmitted over longer distances through water and geological structures than can higher frequency sound waves. Thus, efforts have been undertaken to develop sound sources that can operate at lower frequencies. Very low frequency sources ("VLFS") have been developed that typically have at least one resonance frequency of about 10 Hz or lower. VLFS's are typically characterized by having a source size that is very small as compared to a wavelength of sound for the VLFS. The source size for a VLFS is typically much less than $1/10^{th}$ of a wavelength and more typically on the order of $1/100^{th}$ of a wavelength. For example, a source with a maximum dimension of 3 meters operating at 5 Hz is $1/100^{th}$ of a wavelength in size.

In order to achieve a given level of output in the water, a marine vibrator typically needs to undergo a change in volume. In order to work at depth while minimizing structural weight, the marine vibrator may be pressure balanced with external hydrostatic pressure. As the internal gas (e.g., air) in the marine vibrator increases in pressure, the bulk modulus (or "stiffness") of the internal gas also rises. Increasing the bulk modulus of the internal gas also increases the air-spring effect within the marine vibrator. As used herein, the term "air-spring" is defined as an enclosed volume of gas (e.g., air) that may absorb shock or fluctuations of load due to the ability of the enclosed volume of gas to resist compression and decompression. Increasing the stiffness of the gas in the enclosed volume, increases the air-spring effect and thus the ability of the enclosed volume of gas to resist compression and decompression. This increase in the air-spring effect of the internal gas tends to be a function of the operating depth of the source. Further, the stiffness of the acoustic components of the marine vibrator and the internal gas are the primary determining factors in the marine vibrator's resonance frequency. Accordingly, the resonance frequency generated by the marine vibrator may undesirably increase when the marine vibrator is towed at depth, especially in marine vibrators where the interior volume of the marine vibrator may be pressure balanced with the external hydrostatic pressure.

BRIEF DESCRIPTION OF THE DRAWINGS

These drawings illustrate certain aspects of some of the embodiments of the present invention and should not be used to limit or define the invention.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Embodiments relate generally to marine vibrators for marine geophysical surveys that incorporate one or more piston plates that may act on the surrounding water to produce acoustic energy. In embodiments, the marine vibrators may further comprise one or more drivers coupled to the piston plates to cause the piston plates to move back and forth. The marine vibrators may also include one or more springs coupled to the piston plates and a fixture. The marine vibrators define an internal volume in which a gas may be dispensed. The gas may be any gas or combination of gases (e.g., air, oxygen, nitrogen, carbon dioxide, etc.) that is selected based on the expected operational requirements of the device. One of ordinary skill in the art with the benefit of this disclosure should be able to select an appropriate gas or combination of gas for use in the marine vibrator. In one or more embodiments, gas flow may be restricted in a marine vibrator to compensate for air-spring (also known as "gas-spring") effects. As discussed in more detail below, the gas flow in the marine vibrator may be restricted to make the air-spring more or less stiff to thereby adjust the first resonance frequency at depth.

Figure 1:
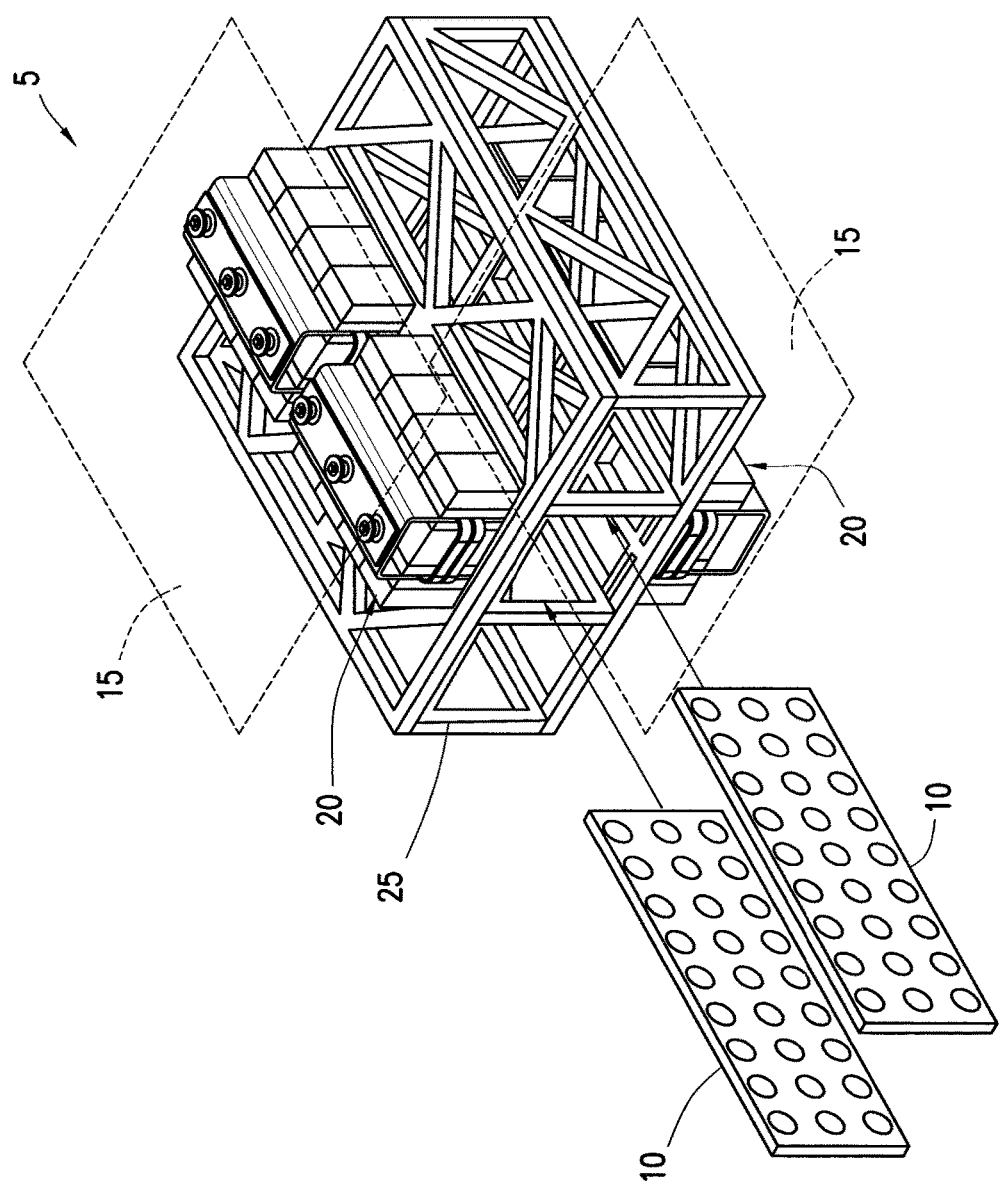
FIG. 1 illustrates an example embodiment of a marine vibrator with a variable gas flow restrictor.
Figure 6:
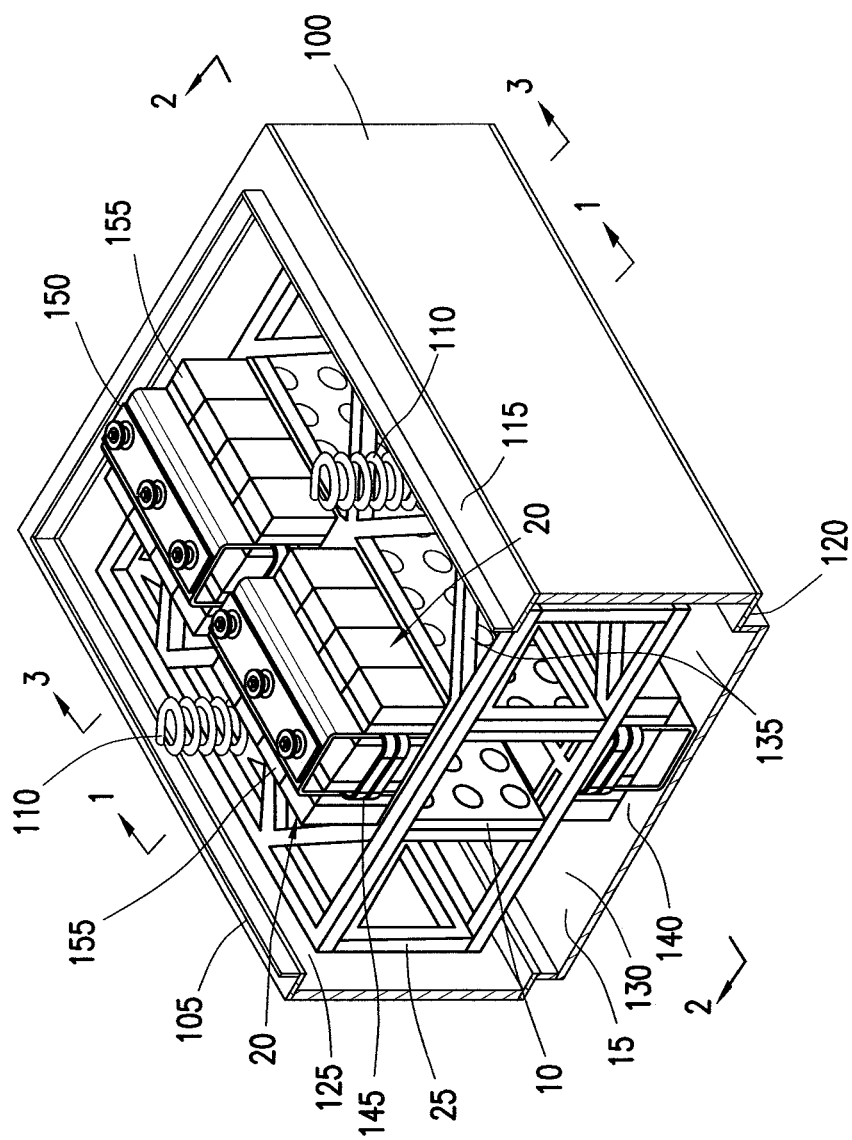
FIG. 6 illustrates a partial cross-sectional view of an example embodiment of a marine vibrator.
Figure 7:
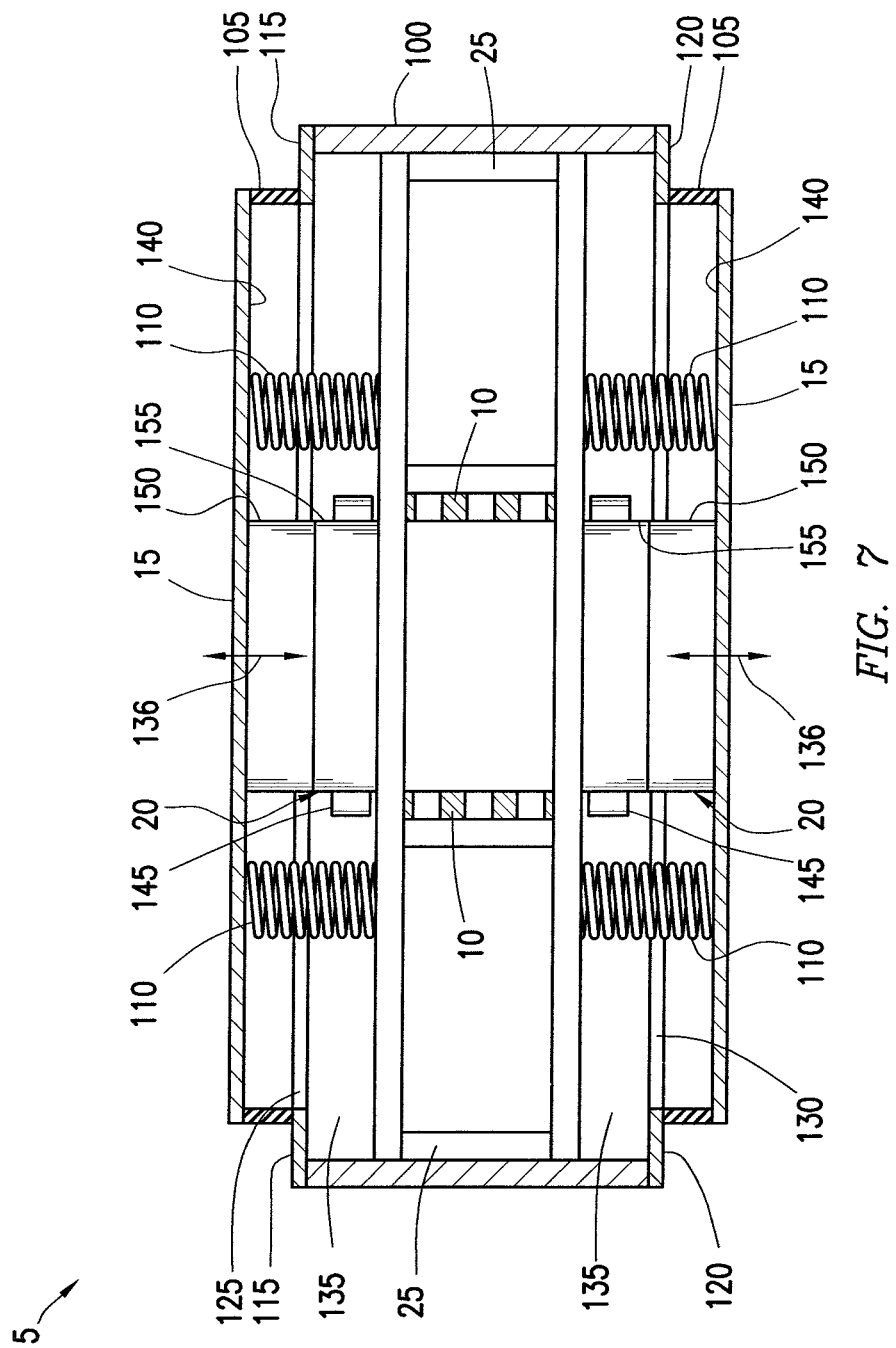
FIG. 7 illustrates a cross-sectional view of the marine vibrator of FIG. 6 taken along line 1-1.
Figure 8:
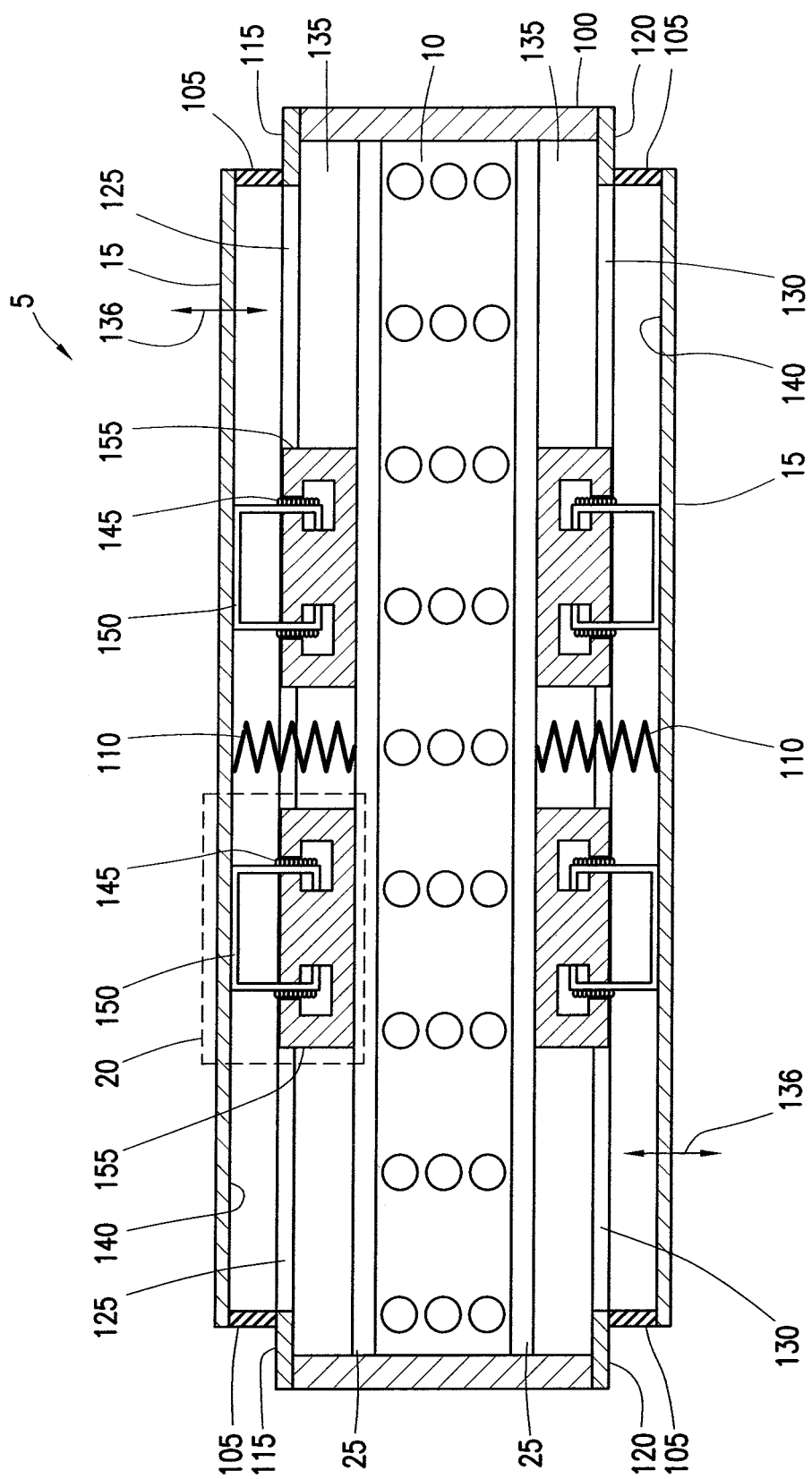
FIG. 8 illustrates a cross-sectional view of the marine vibrator of FIG. 6 taken along line 2-2.

FIG. 1 illustrates an example embodiment of a marine vibrator 5 that includes a variable gas restrictor 10, for example, to restrict gas flow and, thus, compensate for air-spring effects. In the illustrated embodiment, marine vibrator 5 is a piston-type marine vibrator. As illustrated, marine vibrator 5 may include piston plates 15. For the sake of simplicity, this generalized example embodiment provides a general embodiment of the shape and location of piston plates 15; furthermore some of the internal components of marine vibrator 5 are removed so as to not completely or partially obscure the illustrated components. By way of example, piston plates 15 and the containment housing (as best seen in FIGS. 6-8) may at least partially define an internal volume in which a gas may be disposed, as such the gas disposed within marine vibrator 5 may comprise an internal gas pressure. In some embodiments, marine vibrator 5 may comprise a pressure-compensation system. The pressure-compensation system may be used, for example, to equalize the internal gas pressure of marine vibrator 5 with the external pressure. Pressure compensation may be used, for example, where marine vibrator 5 needs to be towed at depth to achieve a given level of output. As the depth of marine vibrator 5 increases, the internal gas pressure may be increased to equalize pressure with the increasing external pressure. A gas (e.g., air) may be introduced into marine vibrator 5, for example, to increase the internal gas pressure.

As illustrated, marine vibrator 5 may further include one or more drivers 20, which may be electro-dynamic drivers, for example. Drivers 20 may be coupled to piston plates 15. As illustrated, marine vibrator 5 may further include a fixture 25 capable of suspending drivers 20 within marine vibrator 5. In the illustrated embodiment, fixture 25 may be in the form of a frame.

In the illustrated embodiment of FIG. 1, variable gas flow restrictor 10 is disposed within the internal volume of marine vibrator 5. As illustrated, variable gas flow restrictor 10 may be secured to fixture 25. In example embodiments, variable gas flow restrictor 10 has a sliding-plate structure that may be movable between a closed position and an open position. In the closed or partially closed position, variable gas flow restrictor 10 may be used to restrict gas flow in marine vibrator 5. In some embodiments, variable gas flow restrictor 10 may completely seal off a portion of the internal volume of marine vibrator 5. Accordingly, the gas flow may be restricted when desired to make the air-spring stiffer, which may be desired in some embodiments. By way of example, it may be desired to make the air-spring stiffer and thus increase the first resonance frequency at shallow depths. This type of air-spring compensation may be performed, for example, when a substantially constant resonance frequency is desired regardless of depth. Without air-spring compensation, the air-spring has a tendency to stiffen as marine vibrator 5 is lowered in the water, thereby causing the first resonance frequency to vary with depth. However, present embodiments may provide a resonance frequency for marine vibrator 5 selected at least in part on variable gas flow restrictor 10 such that marine vibrator 5 may have a substantially constant resonance frequency regardless of depth.

Those of ordinary skill in the art, with the benefit of this disclosure, should appreciate that an increase in the internal gas pressure of the marine vibrator 5 may also result in an increase of the bulk modulus or air-spring effect of the gas (e.g., air) in the marine vibrator 5. Among other things, the resonance frequency of marine vibrator 5 is based on the combination of the air-spring of the gas in marine vibrator 5 and the spring constant of the mechanical spring (e.g., mechanical spring elements 110 on FIG. 6-10). Thus, increasing the air-spring effect of the internal gas of marine vibrator 5 may also result in an increase in the resonance frequency. As such, the resonance frequency of a marine vibrator 5 towed at depth may undesirably vary when towed at varying depths.

Figure 3:
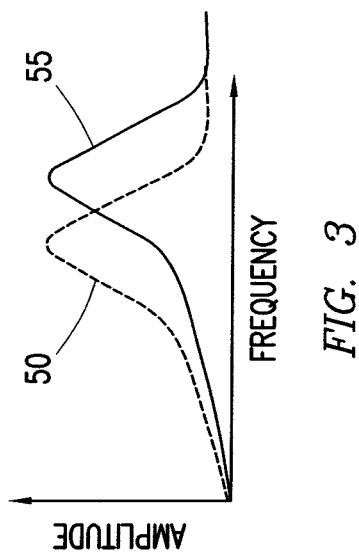
FIG. 3 illustrates the shift in resonance frequency due to the air-spring effect as the marine vibrator is being towed deeper in accordance with example embodiments.
Figure 2:
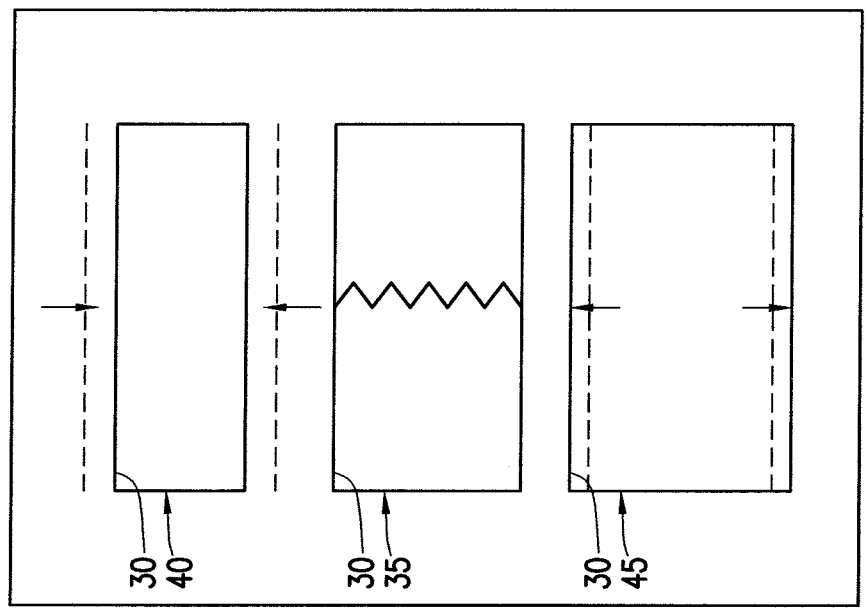
FIG. 2 illustrates the change in the air-spring effect as the pressure and volume of the internal gas is altered in accordance with example embodiments.

FIGS. 2 and 3 illustrate the effect of an air-spring on a marine vibrator 5 at various depths in accordance with example embodiments. In FIG. 2, the volume of the internal gas defined by marine vibrator 5 is represented by reference number 30. To illustrate the air-spring effect, the volume 30 of the internal gas is shown at ambient pressure at 35, under compression at 40, and under expansion at 45. Therefore, FIG. 2 illustrates the relationship between pressure and volume in relation to the air-spring effect. Thus, and assuming a constant temperature, as the volume 30 of the internal gas increases, the pressure of the internal gas will decrease as will the air-spring effect. Conversely, as the volume 30 of the internal gas decreases, the pressure of the internal gas will increase and so too will the stiffness of the air-spring. With respect to FIG. 3, the curve shown at 50 is a hypothetical representation of the output of a marine vibrator 5 at D meters depth without pressure compensation. The curve shown at 55 represents the output of the marine vibrator 5 at D+x meters depth with pressure compensation. Pressure compensation may cause an increase in internal gas pressure and thus a resulting increase in the air-spring effect. As illustrated by FIG. 3, the resonance frequency of marine vibrator 5 may shift higher with pressure compensation, thus showing how an increase in the air-spring effect may result in a higher resonance frequency. As illustrated, the increase in resonance frequency becomes more pronounced at greater depths.

Figure 4:
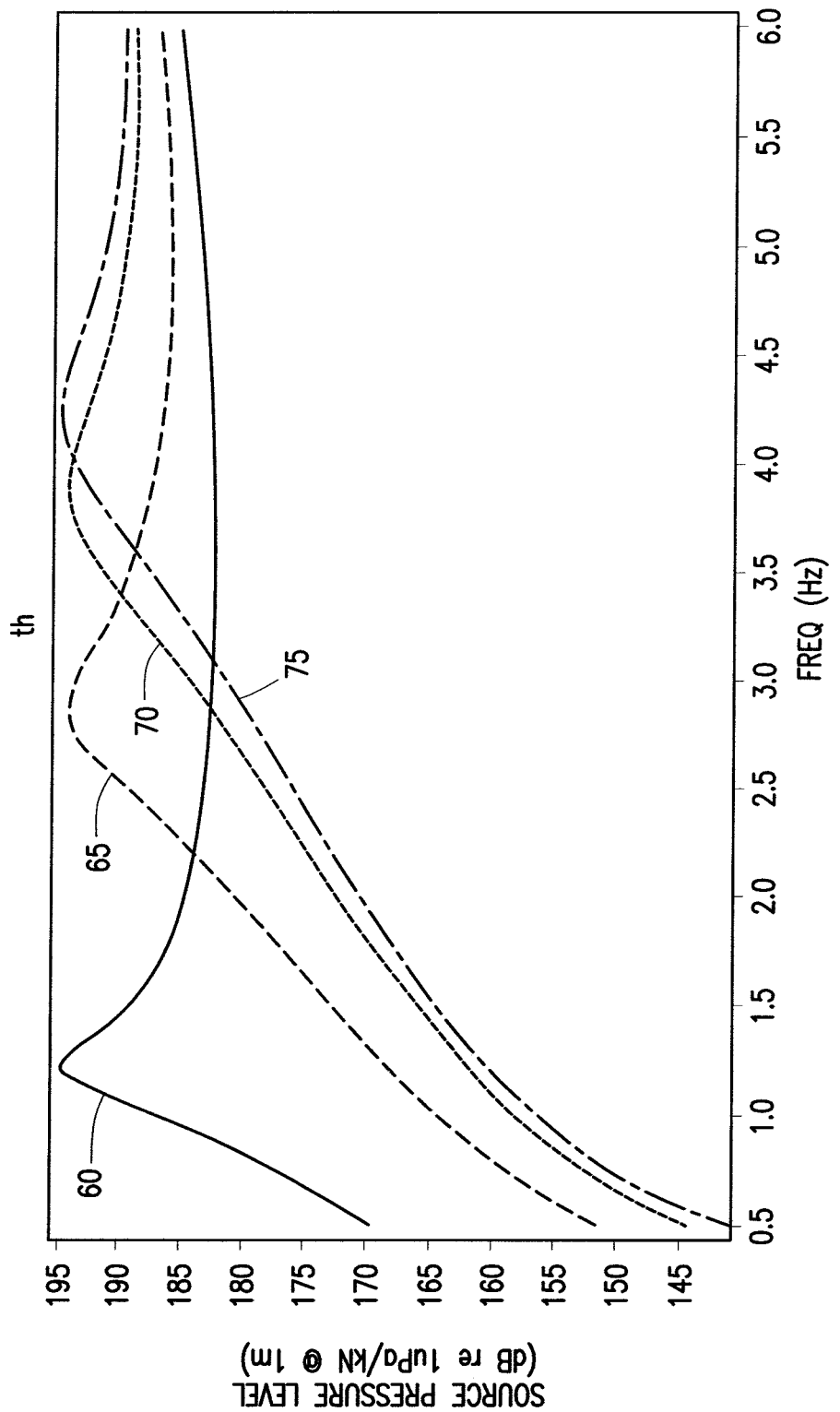
FIG. 4 illustrates simulated amplitude spectra showing the expected effect of compressed gas that generates an airspring as the marine vibrator is being towed deeper in accordance with example embodiments.

FIG. 4 illustrates simulated amplitude spectra from a finite element simulation showing the effect of the air-spring as a function of depth. The curves in FIG. 4 represent the output of a marine vibrator towed at varying depth with pressure compensation. In particular, the curves in FIG. 4 represent the output of the marine vibrator towed at 0 meters, 50 meters, 100 meters, and 120 meters, respectively, shown at 60, 65, 70, and 75. As illustrated, the increase in resonance frequency may be more pronounced at greater depths, thus indicating that the resonance frequency increases as the air-spring is made stiffer.

In accordance with present embodiments, the spring constant of the air-spring may be adjusted by restricting gas flow in marine vibrator 5. By way of example, a variable gas flow restrictor 10 may be disposed within the marine vibrator internal volume, such that variable gas flow restrictor 10 may change the volume of the internal gas 30, by restricting flow of the internal gas throughout at least a portion of the volume of marine vibrator 5. This restriction in the flow may make the air-spring more or less stiff. As the stiffness of the air-spring impacts the resonance frequency, the air-spring stiffness may be adjusted to thereby adjust the resonance frequency. This may be particularly desirable if marine vibrator 5 is to be towed at different depths. In some embodiments, it may be desirable to have the resonance frequency remain substantially constant (e.g., vary by no more than 5%) regardless of depth. However, as previously described, when marine vibrator 5 is towed at depth, the pressure of the internal gas may be increased by the pressure-compensation system such that the air-spring may become stiffer as depth increases. For example, if marine vibrator 5 has a resonance of 2.5 Hz at 120 meters, it may have a much lower resonance (i.e. less than 2.5 Hz) at 50 meters. To compensate for this stiffening of the air-spring, the gas flow in marine vibrator 5 may be restricted at shallower depths to make the air-spring stiffer, thus increasing the resonance frequency to be more consistent with the higher resonance frequencies that occur with increasing depth.

Figure 5:
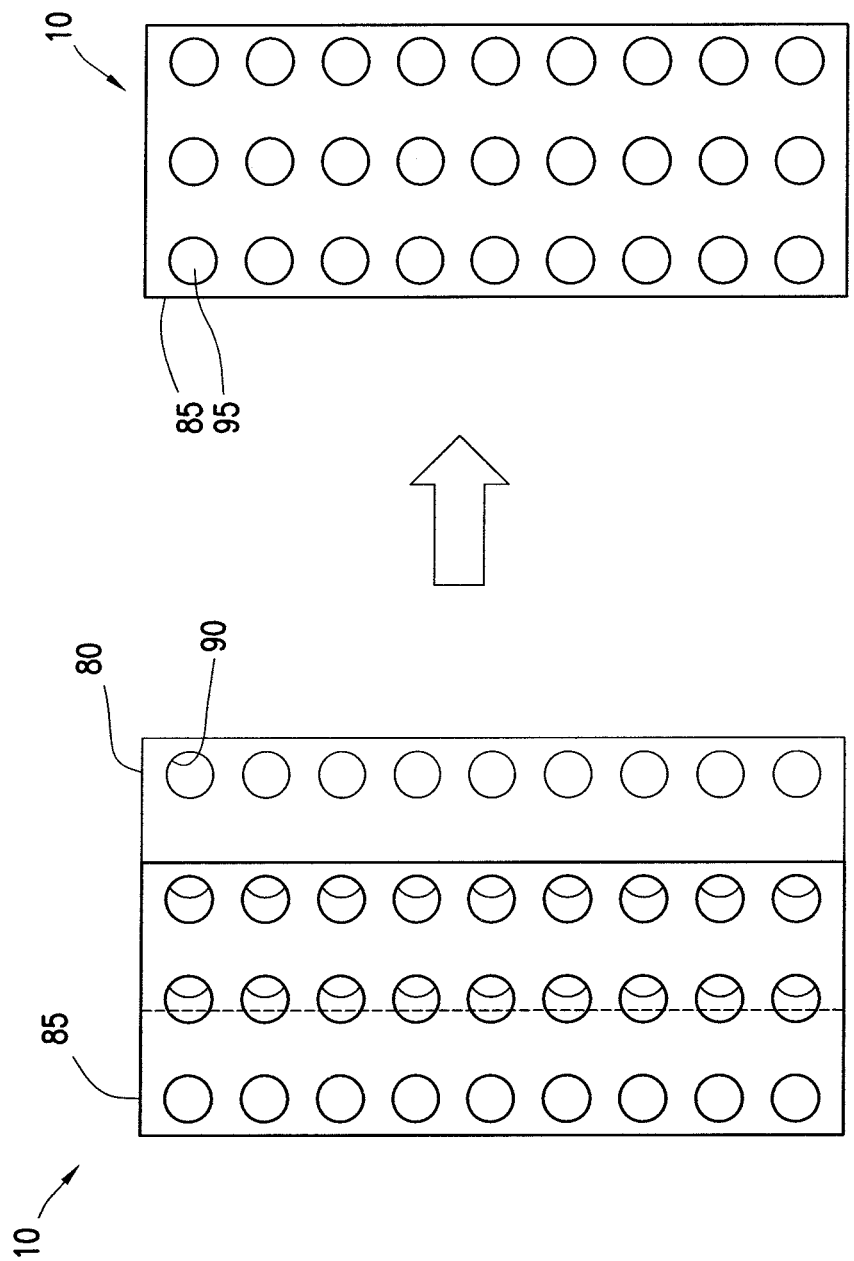
FIG. 5 illustrates an example embodiment of a variable gas flow restrictor for use with a marine vibrator.

With reference now to FIG. 5, an example embodiment of a variable gas flow restrictor 10 will now be described in more detail. As illustrated, variable gas flow restrictor 10 may have a sliding-plate structure that comprises a first plate 80 and a second plate 85. First plate 80 and second plate 85 may both comprise holes 90. First plate 80 and second plate 85, as illustrated, may each be generally rectangular in shape in some embodiments; however, other plate configurations may be suitable including square, circular, elliptical, or irregular-shaped structures. The number of holes 90 in first plate 80 and second plate 85 may be selected in order to obtain the desired amount of gas flow. Each of holes 90 may have a selected diameter and spacing based on the desired amount of gas flow and desired resonance frequency, among others. For example, hole size may be reduced with increased spacing if less gas flow is desired while hole size may be increased with reduced spacing if more gas flow is desired. Holes 90 may, but need not be, of a consistent size or shape within a single plate or relative from one plate to the other.

Variable gas flow restrictor 10 may be adjusted from (or to) a closed or partially closed position (e.g., left side of FIG. 5) to (or from) an open position (e.g., right side of FIG. 5). In the open position, holes 90 in first plate 80 may be aligned with holes 90 in second plate 85 such that openings 95 are formed in variable gas flow restrictor 10 and consequently allowing the flow of the internal gas across openings 95. In the closed position, holes 90 in first plate 80 may be at least partially closed by second plate 85 thus restricting internal gas flow through openings 95. By movement of second plate 85, the size of openings 95 may be reduced, restricting gas flow. In other words, second plate 85 may be positioned to effectively limit the size of openings 95. In some embodiments as shown on FIG. 5, second plate 85 may be positioned to partially close variable gas flow restrictor 10 such that holes 90 in first plate 80 are substantially blocked. An electric drive, pneumatic drive, hydraulic drive, or other suitable drive may be used to adjust openings 95 in variable gas flow restrictor 10. A linkage (not shown) may couple variable gas flow restrictor 10 to a control system that may operate to control the position of second plate 85 and consequently the gas flow through openings 95. Variable gas flow restrictor 10 may be actively or passively controlled, for example, to maintain a substantially constant resonance frequency as the depth of marine vibrator 5 changes. For example, variable gas flow restrictor 10 may be closed at shallower depths to restrict gas flow, thus stiffening the air-spring and increasing the frequency such that a constant resonance frequency is maintained as the depth of marine vibrator 5 is varied. In some embodiments, variable gas flow restrictor 10 may be passively adjusted, for example, based on a pressure sensor. In some embodiments, variable gas flow restrictor 10 may be remotely controlled from the tow vessel or a work boat (e.g., survey vessel 225 on FIG. 11). In some embodiments, variable gas flow restrictor 10 may be fixed in place in some operations. It should be understood that first plate 80 may be movable in some embodiments while second plate 85 remains stationary. Alternatively, second plate 85 may be movable in some embodiments while first plate 80 remains stationary. As an alternative to the use of a second plate 85, each of holes 90 in first plate 80 may instead be fitted with louvers or any other suitable covering (e.g., flapper, guillotine device, etc.) that may be adjusted to permit or restrict the flow of the marine vibrator internal gas through holes 90. Although FIG. 5 illustrates variable gas flow restrictor 10 as a sliding-plate structure, other suitable mechanisms for restricting gas flow in marine vibrator 5 may be used in accordance with example embodiments, including hinged doors, roll-up doors, and the like. For example, a device (e.g., a plate, door, etc.) may be used to seal off a portion of the marine vibrator internal volume available to the air-spring.

Turning now to FIGS. 6-8, and with additional reference to FIG. 1, example embodiments of marine vibrator 5 will now be described. FIG. 6 is a partial cross-sectional view of an example embodiment of marine vibrator 5. FIG. 7 is a cross-sectional view of the embodiment of marine vibrator 5 of FIG. 6 taken along line 1-1. FIG. 8 is a cross-sectional view of the embodiment of marine vibrator 5 of FIG. 6 taken along line 2-2.

In the illustrated embodiment, marine vibrator 5 includes a containment housing 100. Piston plates 15 may be flexibly coupled to containment housing 100, for example, by way of rubber seals 105. As best seen in FIGS. 6-8, piston plates 15 may each have mechanical spring elements 110 attached to them. One or more drivers 20 may be disposed in containment housing 100 to cause the piston plates 15 to move back and forth. This motion of piston plates 15 may take advantage of the flexibility of rubber seals 105. As would be understood by one of ordinary skill in the art with the benefit of this disclosure, rubber seals 105 do not need to be made of rubber, but rather may be made from any material that allows a flexible coupling of piston plates 15 to containment housing 100 as further discussed below.

Containment housing 100 may have first surface 115 and second surface 120, which may be opposing one another. As best seen on FIGS. 6-8, first opening 125 and second opening 130 may be formed respectively in the first surface 115 and the second surface 120. While not illustrated, some embodiments may include windows or openings 125, 130 that are larger or smaller than piston plates 15. Marine vibrator 5 further comprises an interior volume 135 which may be at least partially defined by containment housing 100 and piston plates 15. In some embodiments, mechanical spring elements 110 and drivers 20 may be at least partially disposed within interior volume 135. In alternative embodiments, mechanical spring elements 110 and drivers 20 may be entirely disposed within interior volume 135. While not illustrated, in further alternative embodiments, mechanical spring elements 110 may be disposed outside containment housing 100 so long as mechanical spring elements 110 are coupled to fixture 25. In some embodiments, marine vibrator 5 may be pressure compensated such that the pressure within interior volume 135 may be kept the same as the external pressure (i.e. the pressure on the side of piston plate 15 opposite that of interior volume 135), thus enabling operation at greater depth, for example, up to about 300 meters or more. Containment housing 100 together with piston plates 15 and rubber seals 105 may form a waterproof housing for the other components of marine vibrator 5, such as mechanical spring elements 110 and drivers 20. Containment housing 100 may be constructed from any suitable material, including, without limitation, steel (e.g., stainless steel), aluminum, a copper alloy, glass-fiber reinforced plastic (e.g., glass-fiber reinforced epoxy), carbon fiber reinforced plastic, and combinations thereof. Similarly, containment housing 100 as shown in FIGS. 6-8, may have the general shape of a rectangular box. It should be understood that other configurations of containment housing 100 may be suitable, including those having the general shape of a square box or other suitable shapes.

As illustrated, marine vibrator 5 comprises piston plates 15. Piston plates 15 may typically be constructed of a material that will not deform, bend or flex when in use. By way of example, piston plates 15 may comprise, without limitation, steel (e.g., stainless steel), aluminum, a copper alloy, glass-fiber reinforced plastic (e.g., glass-fiber reinforced epoxy), carbon fiber reinforced plastic, and combinations thereof. In some embodiments, piston plates 15 may be substantially flat and rectangular in shape. By way of example, piston plate 15 shown on FIG. 1 is rectangular in shape. In some embodiments, piston plates 15 may have rounded or smooth corners. In some embodiments, piston plates 15 may in the form of flat, circular disks. By way of example, piston plates 15 may each be a flat, circular disk having substantially uniform thickness. However, other configurations, including both axially-symmetric and not, of piston plates 15 may be suitable for particular applications. By way of example, piston plates 15 may be square, elliptical, or other suitable shape for providing the desired acoustic energy. In alternative embodiments, piston plates 15 may be curved, either convexly protruding into interior volume 135, or concavely expanding interior volume 135. In general, piston plates 15 have a thickness that provides stiffness and also withstands expected pressures. As will be appreciated by those of ordinary skill in the art with the benefit of this disclosure, the plate thickness may vary based on the material of construction, among other factors. As will be discussed in more detail below, the mass load of piston plates 15 and the spring constant of mechanical spring elements 110 may be selected (i.e., tuned) in a manner to produce a first resonance frequency within the desired seismic frequency range when marine vibrator 5 is submerged in water at a depth of from about 0 meters to about 300 meters. While a single piston plate 15 is illustrated on either side of fixture 25, embodiments may include more than one piston plate 15 on either side of fixture 25. Moreover, embodiments may include piston plates 15 that are smaller in size with respect to containment housing 100 as compared to those illustrated on FIGS. 1 and 6-8.

With continued reference to FIGS. 1 and 6-8, piston plates 15 may each be secured to containment housing 100 in a manner that allows movement of piston plates 15 relative to containment housing 100 with substantially no bending or flexing of piston plates 15. In the embodiment of FIG. 1, a pair of piston plates 15 is shown. One of the piston plates 15 may be disposed on one side of containment housing 100 while the other piston plates 15 may be disposed on the opposing side of containment housing 100. As illustrated, one of the piston plates 15 may be coupled to the containment housing 100 at or near the first surface 115 and the other piston plate 15 may be coupled to the containment housing 100 at or near the second surface 120. Piston plates 15 may each cover a corresponding one of the first opening 125 or second opening 130 in the respective first surface 115 and second surface 120 of containment housing 100. In the illustrated embodiment, piston plates 15 are coupled to containment housing 100 by way of rubber seals 105. Rubber seals 105 may not hold piston plates 15 in place but rather may flex (or otherwise move) to permit movement of piston plates 15 at their outer edges. In particular embodiments, piston plates 15 may function as piston transducers, wherein each of the piston plates 15 moves back forth by actuation of the drivers 20. Movement of pistons plates 15 is illustrated in FIGS. 7 and 8 by arrows 136. In contrast to flextensional-shell type marine vibrators, piston plates 15 may not bend or flex in operation, but rather may move back and forth acting against the surrounding water.

Drivers 20 may be one of a variety of types of drivers 20, for example electro-dynamic drivers. In some embodiments, the drivers 20 may be "moving coil" or "voice coil" drivers, which may provide the ability to generate very large acoustic energy amplitudes. Although the particular embodiment described herein shows four uni-directional drivers utilized in parallel, embodiments in which one or more bi-directional drivers, embodiments with one or more uni-directional drivers, or embodiments in which more or less than four uni-directional drivers are utilized, are each within the scope of the invention. As best seen in FIGS. 7 and 8, a pair of drivers 20 may be coupled to an interior surface 140 of one piston plate 15, while another pair of drivers 20 may be coupled to an interior surface 140 of the other piston plate 15. Drivers 20 may also be coupled to fixture 25.

As illustrated, drivers 20 may each comprise a uni-directional, moving coil driver, comprising an electric coil 145, transmission element 150, and magnetic circuitry 155, which work together to generate a magnetic field. As illustrated, magnetic circuitry 155 may be connected to fixture 25, while transmission element 150 may connect to the corresponding piston plate 15. In some embodiments (not illustrated), this arrangement may be reversed (i.e., magnetic circuitry 155 connects to the corresponding piston plate 15, while transmission element 150 connects to fixture 25). As illustrated, each transmission element 150 may transfer the motion of the corresponding electric coil 145 to interior surface 140 of the corresponding piston plate 15. When electrical current I is applied to electric coil 145, a force F acting on electric coil 145 may be generated as follows:

$$F = IlB \tag{Eq. 1}$$

Where I is the current, l is the length of the conductor in electric coil 145, and B is the magnetic flux generated by magnetic circuitry 155. By varying the magnitude of the electrical current and consequently the magnitude of the force acting on electric coil 145, the length of the driver stroke may vary. Each driver 20 may provide stroke lengths of several inches—up to and including about 10"—which may allow the marine vibrator 5 to generate enhanced amplitude acoustic energy output in the low frequency ranges, for example, between about 1 Hz and about 100 Hz, and more particularly, between about 1 and 10 Hz when marine vibrator 5 is submerged in water at a depth of from about 0 meters to about 300 meters. Magnetic circuitry 155 may comprise permanent magnets, though any device capable of generating a magnetic flux may be incorporated.

In the illustrated embodiment, mechanical spring elements 110 (e.g., in the form of coil springs) are disposed in containment housing 100 on either side of fixture 25. As best seen in FIG. 6, pairs of mechanical spring elements 110 may be located on either side of fixture 25, with a first pair of mechanical spring elements 110 disposed on one side of fixture 25, and a second pair of mechanical spring elements 110 may be disposed on the opposing side of fixture 25. Mechanical spring elements 110 in the first pair may be disposed on opposite sides of the drivers 20 from one another, while the other pair of mechanical spring elements 110 may also be disposed on opposite side of the drivers 20 from one another. Mechanical spring elements 110 may each extend between a corresponding one of piston plates 15 and fixture 25. Mechanical spring elements 110 may be coupled to fixture 25 and at least one of piston plates 15 to exert a biasing action against piston plates 15. A wide variety of different mechanical spring elements 110 may be used that are suitable for exerting the desired biasing action against piston plates 15, including both linear and non-linear springs. In particular embodiments, mechanical spring elements 110 may be any of a variety of different types of springs, including compression springs, torsion springs, or other suitable springs for exerting the desired biasing action. Specific examples of mechanical spring elements 110 that may be used include coil springs, flat springs, bow springs, and leaf springs, among others. Suitable mechanical spring elements 110 may be constructed from spring steel or other suitable resilient material, such as glass-fiber reinforced plastic (e.g., glass-fiber reinforced epoxy), carbon fiber reinforced plastic, and combinations thereof. In some embodiments, the dimensions, material make-up, and the shape of mechanical spring elements 110 may be selected to provide a sufficient spring constant for vibrations in the seismic frequency range of interest when the marine vibrator 5 is submerged in water at a depth of from about 0 meters to about 300 meters.

In the illustrated embodiment, marine vibrator 5 further includes variable gas flow restrictor 10 disposed within interior volume 135 of marine vibrator 5. As illustrated, variable gas flow restrictor 10 may be secured to fixture 25. As previously described, variable gas flow restrictor 10 may be movable between an open position and a closed position to restrict gas flow in marine vibrator 5. By way of example, restriction of gas flow may be used to increase the first resonance frequency by stiffening the air-spring.

In some embodiments, a fixture 25 suspends drivers 20 within containment housing 100. For example, in the illustrated embodiment, fixture 25 extends along the major axis of containment housing 100 and may be coupled to either end of containment housing 100. Fixture 25 may be circular, square, rectangular, or other suitable cross-section as desired for a particular application. An example of a suitable fixture 25 may include a rod, beam, plate, or other suitable frame for supporting internal components such as drivers 20 in containment housing 100. In particular embodiments, fixture 25 should be fixed to containment housing 100 in a manner that restricts movement and therefore prevents undesired contraction of the major axis of containment housing 100. In particular embodiments, piston plates 15 may work in symmetry above and below fixture 25. In other words, in some embodiments, fixture 25 may divide marine vibrator 5 into symmetrical halves with respect to at least piston plates 15, mechanical spring elements 110, and drivers 20.

In the illustrated embodiment, coupling of rubber seals 105 to piston plates 15 is shown. Rubber seals 105 may also be coupled to containment housing 100, for example, to form a water-tight seal between piston plates 15 and containment housing 100. In general, rubber seals 105 may be configured to allow movement of piston plates 15 while also maintaining the appropriate seal. Rubber seals 105 may have significant curvature to permit significant amplitude of movement. By way of example, this permitted movement may further enable piston plates 15 to have several inches of travel, e.g., piston plates 15 may move back and forth relative to containment housing 100 a distance of from about 1 inch to about 10 inches (or more). Other techniques for permitting movement may be used, including the use of seals with bellows or accordion-type configurations.

As would be understood by one of ordinary skill in the art, the total impedance that may be experienced by a marine vibrator 5 may be expressed as follows:

$$Z_r = R_r + jX_r \tag{Eq. 2}$$

where $Z_r$ is total impedance, $R_r$ is radiation impedance, and $X_r$ is reactive impedance.

In an analysis of the energy transfer of marine vibrator 5, the system may be approximated as a baffled piston. In the expression of the total impedance that will be experienced, the radiation impedance $R_r$ of a baffled piston may be:

$$R_r = \pi a^2 \rho_0 c R_1(x) \tag{Eq. 3}$$

and the reactive impedance may be:

$$X_r = \pi a^2 \pi_0 c X_1(x) \tag{Eq. 4}$$

where $$x = 2ka = (4\pi a/\lambda) = (2\omega a/c) \tag{Eq. 5}$$

and where $$R_1(x) = 1 - (2/x)J_{1(x)} \tag{Eq. 6}$$

and $$X_1(x) = \left(\frac{4}{\pi}\right)\int_0^{\pi/2} \sin(x\cos\alpha)\sin^2\alpha d\alpha \tag{Eq. 7}$$

where $\rho_o$ is the density of water, $\omega$=radial frequency, $k$=wave number, $a$=radius of piston, $c$=sound velocity, $\lambda$=wave length, and $J_1$=Bessel function of the first order.

Using the Taylor series expansion on the above equations yields the following:

$$R_1(x) = \frac{x^2}{2^2 1! 2!} - \frac{x^4}{2^4 2! 3!} + \ldots \quad \text{(Eq. 8)}$$

$$X_1(x) = \frac{4}{\pi}\left(\frac{x}{3} - \frac{x^3}{3^2 5} + \frac{x^5}{3^2 5^2 7} - \ldots\right) \quad \text{(Eq. 9)}$$

For low frequencies, when $x=2$ ka is much smaller than 1, the real and imaginary part of the total impedance expression may be approximated with the first term of the Taylor expression. The expressions for low frequencies, when the wave length is much larger than the radius of the piston becomes:

$$R_1(x) = (\tfrac{1}{2})(ka)^2 \quad \text{(Eq. 10)}$$

$$X_1(x) \rightarrow (8ka)/(3\pi) \quad \text{(Eq. 11)}$$

It follows that, for low frequencies, R will be a small number compared to X, which suggests a very low efficiency signal generation. However, embodiments may introduce a resonance in the lower end of the frequency spectrum so that low frequency acoustic energy may be generated more efficiently. At resonance, the imaginary (reactive) part of the impedance is cancelled, and marine vibrator 5 may be able to efficiently transmit acoustic energy into the body of water.

Figure 9:
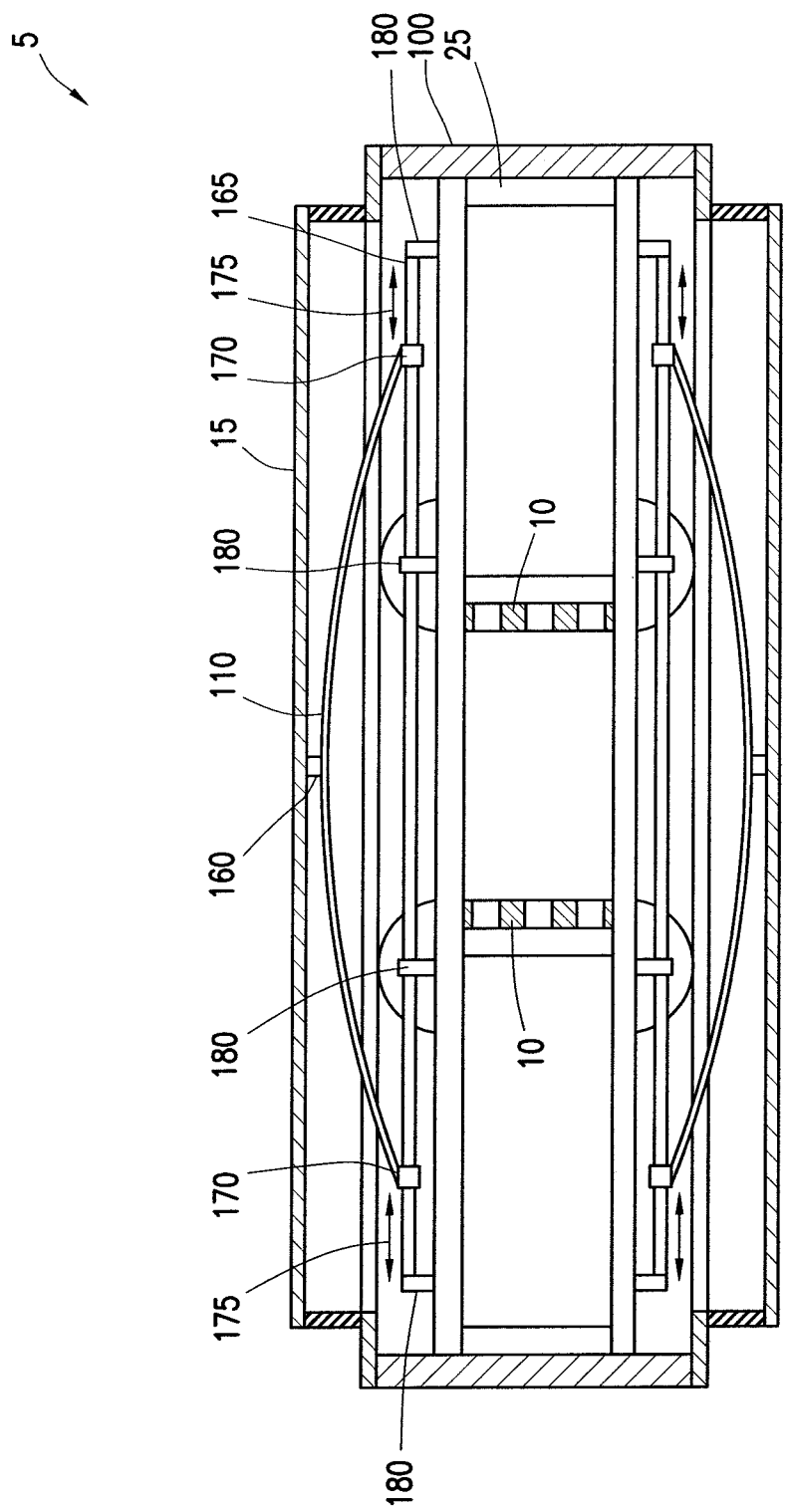
FIG. 9 illustrates a cross-sectional view of an embodiment of a marine vibrator with an alternative embodiment of mechanical spring element taken along line 3-3 of FIG. 6.

FIG. 9 illustrates a cross-sectional view of one embodiment of marine vibrator 5 that comprises an alternative embodiment of mechanical spring elements 110. This cross-sectional view is taken along line 3-3 of FIG. 6. In contrast to the mechanical spring elements 110 of FIGS. 6-8 which are illustrated as coiled springs, FIG. 9 illustrates mechanical spring elements 110 in the form of a bow spring. In this cross-sectional view of FIG. 9, certain elements of marine vibrator 5, such as the drivers 20, are not visible.

The following description is for one of mechanical spring elements 110; however, because fixture 25 provides a line of symmetry, this description is equally applicable to both of mechanical spring elements 110. As illustrated in FIG. 9, one of mechanical spring elements 65 may be coupled to one of piston plates 15 and fixture 25. Mechanical spring element 110 may be coupled to piston plate 10 at attachment point 160, which may be a fixed connection, for example, that does not permit movement. Mechanical spring element 110 may be coupled to supplemental fixture 165, which may be in the form of a beam, rod, or other suitable frame for supporting mechanical spring element 110 in containment housing 100. Mechanical spring element 110 may be coupled to supplemental fixture 165 by way of bearings 170. In particular embodiments, bearings 170 may be linear bearings that permit linear movement of the ends of mechanical spring element 110 as represented by arrows 175. In this manner, mechanical spring element 110 may be allowed to flex and provide a biasing force to piston plate 15 upon its movement. Supplemental fixture 165 may be coupled to fixture 25 at one or more of fixture attachment points 180, which may be fixed connections that do not permit movement. Additionally, marine vibrator 5 of FIG. 9 is illustrated with a variable gas flow restrictor 10 attached to fixture 25 in a substantially similar manner as was illustrated in FIGS. 1 and 6-8. As in FIGS. 1 and 6-8, variable gas flow restrictor 10 may be used to vary the first resonance frequency by varying the gas flow and thus the stiffness of the air-spring. Therefore, the resonance frequency for marine vibrator 5 is selected based at least in part on variable gas flow restrictor 10.

Figure 10:
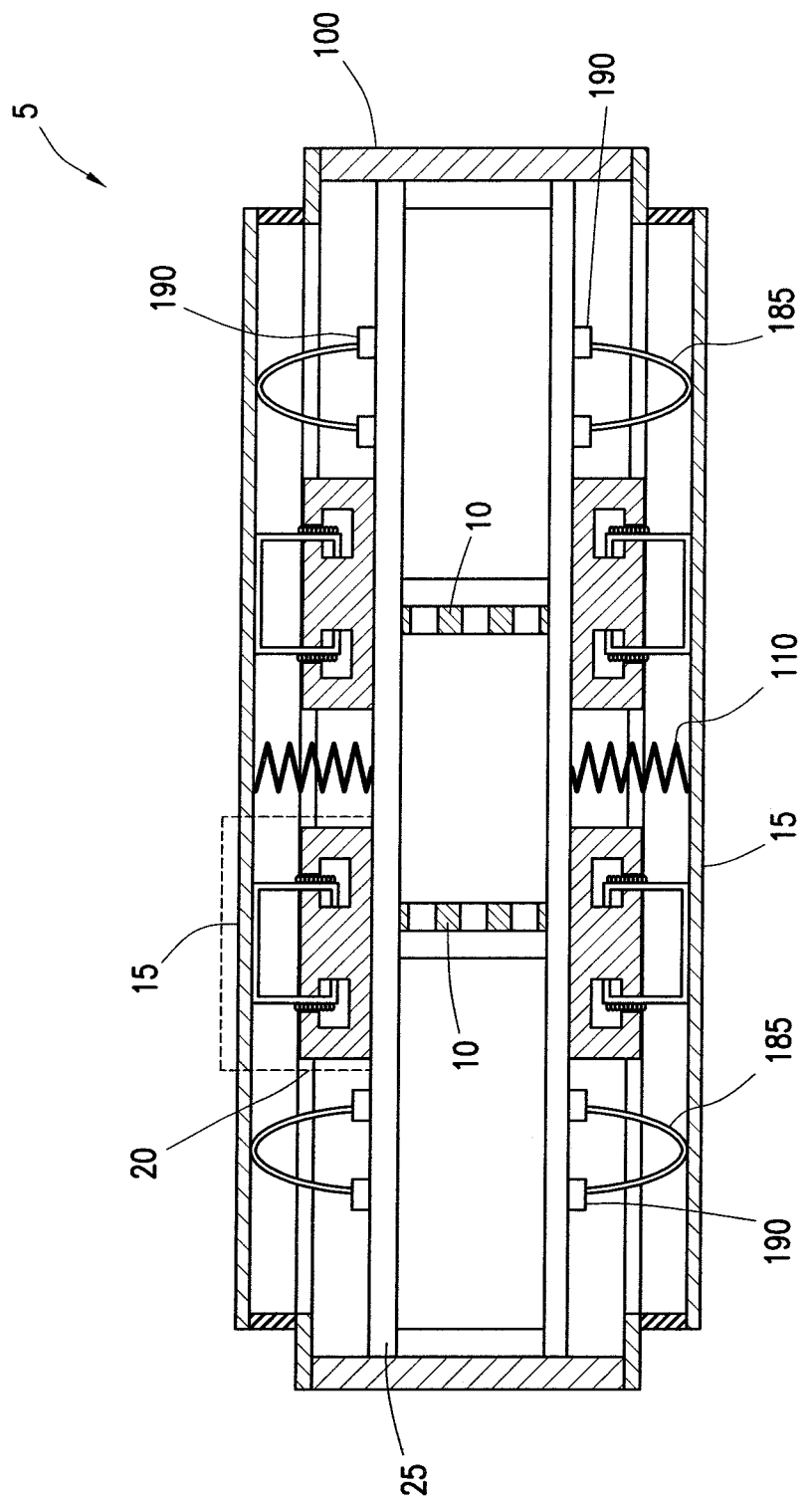
FIG. 10 illustrates another example embodiment of the marine vibrator of FIG. 6 with a variable gas flow restrictor in cross-section.

Turning now to FIG. 10, marine vibrator 5 is illustrated as further comprising two mass spring elements 185 with weights 190 affixed thereto. Mass springs elements 185 shown on FIG. 10 may also be used in conjunction with the mechanical spring elements 110 shown on FIG. 9 (or other suitable type of mechanical spring element 110). As illustrated, mass spring elements 185 may be generally elliptically shaped. As illustrated, mass spring elements 185 may be coupled to fixture 25 and piston plates 15. In the illustrated embodiment, a pair of mass spring elements 185 are shown on either side of fixture 25 so that marine vibrator 5 comprises four mass spring elements 185. However, it should be understood that more or less than four mass spring elements 185 may be utilized for a particular application. As will be described below, in various embodiments, the spring constant of mass spring elements 185 and the mass of weights 190 may be selected in a manner to achieve a second system resonance frequency within the seismic frequency range of interest when marine vibrator 5 is submerged in water at a depth of from about 0 meters to about 300 meters. In a particular embodiment, marine vibrator 5 may exhibit a first resonance frequency of about 2.5 Hz and a second resonance frequency of about 4.5 Hz when submerged in water at a depth of from about 0 meters to about 300 meters. Although a marine vibrator 5 that does not include mass spring elements 185, as shown in the embodiment illustrated in FIGS. 6-8, may display a second resonance frequency, the second resonance frequency would typically be much higher and thus outside the seismic frequency range of interest. Additionally, marine vibrator 5 of FIG. 10 is illustrated with a variable gas flow restrictor 10 attached to fixture 25 in a substantially similar manner as was illustrated in FIGS. 1 and 6-8. As in FIGS. 1 and 6-8, variable gas flow restrictor 10 may be used to vary the first resonance frequency by varying the gas flow and thus the stiffness of the air-spring. Therefore, the resonance frequency for marine vibrator 5 is selected based at least in part on variable gas flow restrictor 10.

In some embodiments, marine vibrator 5 may display at least one resonance frequency (when submerged in water at a depth of from about 0 meters to about 300 meters) between about 1 Hz to about 200 Hz. In alternative embodiments, marine vibrator 5 may display at least one resonance frequency (when submerged in water at a depth of from about 0 meters to about 300 meters) between about 0.1 Hz and about 100 Hz, alternatively, between about 0.1 Hz and about 10 Hz, and alternatively, between about 0.1 Hz and about 5 Hz. In some embodiments, marine vibrator 5 may display at least two resonance frequencies of about 10 Hz or lower. In some embodiments, the first resonance frequency may be adjusted by restricting the gas flow in interior volume 135 of marine vibrator 5. In particular embodiments, the first resonance frequency may be increased by the restriction of gas flow in marine vibrator 5. By way of example, the first resonance frequency may be adjusted to be substantially constant regardless of depth. In FIG. 10, the first resonance frequency may result substantially from interaction of outer piston plate 15 and mechanical spring element 110. The second resonance frequency may result substantially from the interaction of mass spring elements 185 with added weights 190.

In evaluating air-spring effects, finite element analysis may be utilized as known to those of ordinary skill in the art.

In such an analysis, the following principles may be relevant. Piston plate 15 of marine vibrator 5 is approximated as a baffled piston, then, for low frequencies, the mass load, or the equivalent fluid mass acting on the piston plate may be:

$$M_{piston} = \rho_o (8a^3/3) \quad \text{(Eq. 12)}$$

where $M_{plate}$ is the mass load acting on piston plate 15, $\rho_o$ is the density of water surrounding marine vibrator 5, and a is the equivalent radius for a piston plate which corresponds to the size of piston plate 15.

The stiffness of the entrained gas (air-spring) may be described by the following general formula:

$$K_{variableairspring} = \Delta \text{Volume}/\text{Volume} * P * \gamma \quad \text{(Eq. 13)}$$

where: $K_{variableairspring}$ is the air-spring value, Volume is the internal volume of marine vibrator 5, $\Delta$Volume is the change in volume due to the action of marine vibrator 5, P is the absolute pressure of the gas inside marine vibrator 5, and $\gamma$ is the adiabatic constant which is a unique property dependent on the chemical composition of the gas.

Therefore, when accounting for the air-spring effects, the first resonance frequency, $f_{resonance-1}$, due to interaction of piston plate 15 and mechanical spring element 110 may be substantially determined by the following mass spring relationship:

$$f_{resonance-1} = \frac{1}{2\pi} \sqrt{\frac{K_{piston\_spring} + K_{variablespring}}{M_{piston}}} \quad \text{(Eq. 14)}$$

where $K_{piston\_spring}$ is the spring constant of mechanical spring elements 110, $K_{variableairspring}$ is the gas-spring value determined by the change in gas volume using, for example, Equation 13 above, and $M_{piston}$ is the mass load of piston plate 15. Accordingly, it may be possible, as shown above, to adjust the first resonance frequency by compensating for the air-spring. By restriction of the gas flow, the effective volume of gas can be changed, which results in a change in the gas-spring value. The first resonance frequency should also change as the air-spring value has also changed. For example, a stiffer air-spring due to an increase in pressure or a reduction in basic volume of gas will have a higher gas-spring value thus causing a corresponding increase in the first resonance frequency.

To achieve efficient energy transmission in the seismic frequency range of interest, it may be desirable to achieve a second resonance frequency within the seismic frequency range of interest. In the absence of mass spring elements 185 (as shown in FIG. 10) with added weights 190 (also as shown in FIG. 10), the second resonance frequency would typically occur when piston plate 10 has its second Eigenmode. This resonance frequency, however, is normally much higher than the first resonance frequency and not desirable, and accordingly, would typically be outside the seismic frequency range of interest. As is evident from the foregoing equation, the resonance frequency will be reduced if mass load on the piston plates 15 is increased. However, in order to add sufficient mass to achieve a second resonance frequency within the seismic frequency range of interest, the amount of mass required to achieve a desirable second resonance frequency may make such a system less practical for use in marine seismic surveying operations.

Therefore, in some embodiments, mass spring elements 185 may be included inside marine vibrator 5 with added weights 190 on the side of mass spring elements 185. Mass spring elements 185 may have a transformation factor $T_{spring}$ between the long and short axis of its ellipse, so that the deflection of the two side portions will have a higher amplitude than the deflection of the end attached to piston plates 15 and drivers 20.

The effect of such added weights 190 is equivalent to adding mass on the end of driver 20 where it is coupled to piston plate 15.

$$M_{spring} = (T_{spring})^2 \cdot M_{added} \quad \text{(Eq. 14)}$$

Use of mass spring elements 185 with added weights 190, may allow the second resonance frequency of the system to be tuned so that the second resonance frequency is within the seismic frequency range of interest, thereby improving the efficiency of marine vibrator 5 in the seismic frequency range of interest.

$$f_{resonance2} = \frac{1}{2\pi} \sqrt{\frac{K_{spring} + K_{piston\_spring}}{(T_{spring})^2 \cdot M_{added} \cdot + M_{piston} + M_{massload}}} \quad \text{(Eq. 15)}$$

where $K_{spring}$ is the spring constant of mass spring elements 185, and $K_{piston\_spring}$ is the spring constant of mechanical spring elements 110 attached to piston plate 15.

Accordingly, it may be possible, as shown above, to select weights 190 on mass spring elements 185 to tune the second resonance frequency. It may also be possible to select the extent of influence the second resonance frequency may have on the system. By way of example, if mass spring elements 185 have low spring constants compared to mechanical spring element 110 coupled to piston plate 15, and a matching weight 190 is added to mass spring elements 185, mass spring elements 185 with weights 190 will function relatively independently from mechanical spring element 110 attached to piston plate 15. In such cases, the second resonance frequency may be as follows:

$$f_{resonance2} = \frac{1}{2\pi} \sqrt{\frac{K_{spring}}{(T_{spring})^2 \cdot M_{added}}} \quad \text{(Eq. 16)}$$

In the same way, it may also be possible in some embodiments to make the second resonance frequency very large by selecting a high spring constant for mass spring elements 185 with a matching weight 190 such that the second resonance frequency will have a larger amplitude than the first resonance frequency.

Figure 11:
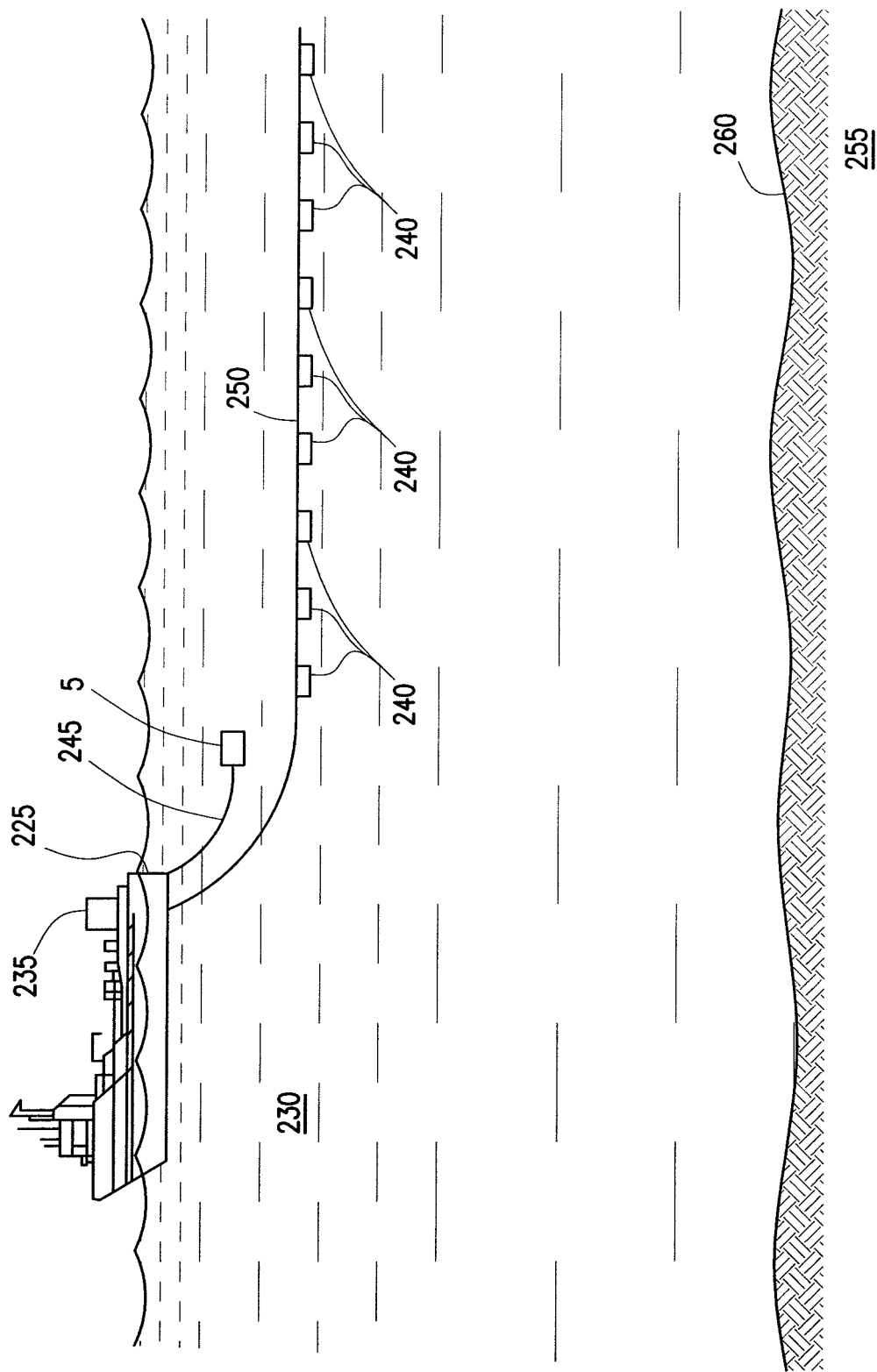
FIG. 11 is an example embodiment of a marine seismic survey system using a marine vibrator.

FIG. 11 illustrates an example technique for acquiring geophysical data that may be used with embodiments of the present techniques. In the illustrated embodiment, a survey vessel 225 moves along the surface of a body of water 230, such as a lake or ocean. The survey vessel 225 may include thereon equipment, shown generally at 235 and collectively referred to herein as a "recording system." The recording system 235 may include devices (none shown separately) for detecting and making a time indexed record of signals generated by each of seismic sensors 240 (explained further below) and for actuating a marine vibrator 5 at selected times. The recording system 235 may also include devices (none shown separately) for determining the geodetic position of the survey vessel 225 and the various seismic sensors 240.

As illustrated, survey vessel 225 (or a different vessel) may tow marine vibrator 5 in body of water 230. Source cable 245 may couple marine vibrator 5 to survey vessel 225. Marine vibrator 5 may be towed in body of water 230 at a depth ranging from 0 meters to about 300 meters, for example. While only a single marine vibrator 5 is shown in FIG. 11, it is contemplated that embodiments may include more than one marine vibrator 5 (or other type of sound source) towed by survey vessel 225 or a different vessel. In some embodiments, one or more arrays of marine vibrators 5 may be used. At selected times, marine vibrator 5 may be triggered, for example, by recording system 235, to generate acoustic energy. Survey vessel 225 (or a different vessel) may further tow at least one sensor streamer 250 to detect the acoustic energy that originated from marine vibrator 5 after it has interacted, for example, with rock formations 255 below water bottom 260. As illustrated, both marine vibrator 5 and sensor streamer 250 may be towed above water bottom 260. Sensor streamer 250 may contain seismic sensors 240 thereon at spaced apart locations. In some embodiments, more than one sensor streamer 250 may be towed by survey vessel 225, which may be spaced apart laterally, vertically, or both laterally and vertically. While not shown, some marine seismic surveys locate the seismic sensors 240 on ocean bottom cables or nodes in addition to, or instead of, a sensor streamer 250. Seismic sensors 240 may be any type of seismic sensors known in the art, including hydrophones, geophones, particle velocity sensors, particle displacement sensors, particle acceleration sensors, or pressure gradient sensors, for example. By way of example, seismic sensors 240 may generate response signals, such as electrical or optical signals, in response to detected acoustic energy. Signals generated by seismic sensors 240 may be communicated to recording system 235. The detected energy may be used to infer certain properties of the subsurface rock, such as structure, mineral composition and fluid content, thereby providing information useful in the recovery of hydrocarbons.

In accordance with an embodiment of the invention, a geophysical data product may be produced. The geophysical data product may include geophysical data that is obtained by a process that includes detecting the acoustic energy originating from marine vibrator 5. The geophysical data product may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis, including further data processing, may be performed on the data product.

The foregoing figures and discussion are not intended to include all features of the present techniques to accommodate a buyer or seller, or to describe the system, nor is such figures and discussion limiting but exemplary and in the spirit of the present techniques.

What is claimed is:

1. A marine vibrator comprising:
    a containment housing;
    a piston plate configured to act on water surrounding the marine vibrator to produce acoustic energy;
    a fixture coupled to the containment housing;
    an interior volume at least partially defined by the containment housing and the piston plate;
    a mechanical spring element coupled to the piston plate and the fixture;
    a driver coupled to the piston plate and the fixture; and
    a variable gas flow restrictor disposed in the interior volume of the marine vibrator, wherein the variable gas flow restrictor comprises adjustable openings moveable to seal off a portion of the interior volume.

2. The marine vibrator of claim 1, wherein the adjustable openings are pneumatically or hydraulically actuated.

3. The marine vibrator of claim 2, wherein the adjustable openings are fitted with louvers.

4. The marine vibrator of claim 1, wherein the marine vibrator has at least one resonance frequency of about 10 Hz or lower when submerged in water at a depth of from about 0 meters to about 300 meters.

5. The marine vibrator of claim 1, wherein the driver is a moving coil driver or a linear servo motor.

6. The marine vibrator of claim 1, comprising another variable gas flow restrictor disposed in the interior volume of the marine vibrator.

7. The marine vibrator of claim 1, wherein the gas flow restrictor comprises a sliding-plate structure.

8. The marine vibrator of claim 1, wherein the variable gas flow restrictor is remotely controlled.

9. The marine vibrator of claim 1, wherein the mechanical spring element comprises at least one type of spring selected from the group consisting of: a bow spring, a coil spring, a flat spring, and a leaf spring.

10. The marine vibrator of claim 1, wherein the piston plate is coupled to the containment housing by way of a rubber seal, the piston plate covering an opening in a first surface of the containment housing.

11. The marine vibrator of claim 1, wherein the marine vibrator further comprises a mass spring element having weights affixed thereto, the mass spring element being coupled between the fixture and the piston plate.

12. The marine vibrator of claim 1, wherein fixture extends along a major axis of the containment housing and is coupled to either end of the containment housing, and wherein the fixture supports the driver in the containment housing.

13. The marine vibrator of claim 1, wherein the mechanical spring element extends between the fixture and the piston plate.

14. The marine vibrator of claim 1, wherein the mechanic spring element comprises a pair of mechanical spring elements on opposite sides of the driver from one another and extending between the fixture and the piston plate.

15. The marine vibrator of claim 14, wherein the pair of mechanical spring elements comprises a pair of coil springs.

16. The marine vibrator of claim 14, wherein the mechanical spring element comprises a bow spring coupled to the piston plate at an attachment point and a supplemental fixture coupled to the fixture, wherein the bow spring is coupled to the supplemental fixture by linear bearings that permit linear movement of the ends of the bow spring.

17. A method comprising:
    towing a marine vibrator in a body of water in conjunction with a marine seismic survey, wherein the marine vibrator comprises a variable gas flow restrictor, wherein the variable gas flow restrictor comprises adjustable openings moveable to seal off a portion of an internal volume of the marine vibrator;
    triggering the marine vibrator to cause one or more piston plates in the marine vibrator to move back and forth wherein one or more mechanical spring elements exert a biasing force against the one or more piston plates; and adjusting the adjustable openings based on depth of the marine vibrator in the body of water to vary the gas flow in the internal volume of the marine vibrator.

18. The method of claim 17, wherein the marine vibrator is towed at a first depth of from about 0 meters to about 300 meters, wherein the method further comprises towing the acoustic vibrator at a second depth, and wherein the gas flow is restricted in the marine vibrator when towed at the first depth such that a first resonance frequency of the acoustic vibrator is substantially constant when towing depth varies from the first depth to the second depth.

19. The method of claim 17, wherein the adjustable openings are fitted with flappers or a guillotine device.

20. The method of claim 17, wherein the adjusting the adjusting openings adjusts an air spring stiffness.

21. The method of claim 17, wherein the adjusting comprises adjusting a diameter and spacing of the adjustable openings.

22. The method of claim 17, wherein the marine vibrator generates a first resonance frequency within a frequency range of about 1 Hz and about 10 Hz.

23. The method of claim 17, wherein the adjustable openings are pneumatically or hydraulically adjustable.

24. The method of claim 17, further comprising:
obtaining geophysical data; and
processing the geophysical data to generate a geophysical data product,
wherein the geophysical data product is obtained by a process that includes detecting acoustic energy originating from the marine vibrator.

25. The method of claim 24, further comprising recording the geophysical data product on a tangible, non-volatile computer-readable medium suitable for importing onshore.

* * * * *